United States Patent [19]

McClure

[11] 4,053,172
[45] Oct. 11, 1977

[54] STEP ASSEMBLY FOR CONSTRUCTION VEHICLES

[75] Inventor: Randall D. McClure, Decatur, Ill.

[73] Assignee: Caterpillar Tractor Co., Peoria, Ill.

[21] Appl. No.: 628,021

[22] Filed: Nov. 3, 1975

[51] Int. Cl.² .............................................. B60R 3/02
[52] U.S. Cl. ................................... 280/163; 182/89; 182/91
[58] Field of Search ................. 280/163, 166; 182/89, 182/90, 91; 105/443, 447

[56] References Cited

U.S. PATENT DOCUMENTS

| 991,625 | 5/1911 | Lewis | 182/89 |
| 2,702,195 | 2/1955 | Merrill | 182/89 |
| 3,244,433 | 4/1966 | Grigsby | 280/163 |

FOREIGN PATENT DOCUMENTS

| 475,981 | 8/1951 | Canada | 280/166 |

*Primary Examiner*—Robert R. Song
*Assistant Examiner*—R. Schrecengost

*Attorney, Agent, or Firm*—Phillips, Moore, Weissenberger, Lempio & Majestic

[57] ABSTRACT

A construction vehicle, such as a motor grader, is provided with at least one step assembly to facilitate access to the operator's station thereof. The step assembly comprises a mounting bracket secured to a frame of the vehicle and a support bracket pivotally mounted on the mounting bracket. A spring-loaded and releasable detent is provided between the mounting and support brackets for permitting swinging movements of the support bracket and a first step attached on a lower end thereof, relative to the mounting bracket.

The support bracket preferably comprises a first member pivotally mounted on the mounting bracket, a second member pivotally mounted on a lower end of the first member for swinging movements perpendicular to the swinging movements of the first member relative to the mounting bracket. The first step is secured on a lower end of the second member whereas a second step is preferably attached to the second member and disposed vertically thereabove.

16 Claims, 6 Drawing Figures

U.S. Patent  Oct. 11, 1977  Sheet 2 of 2  4,053,172
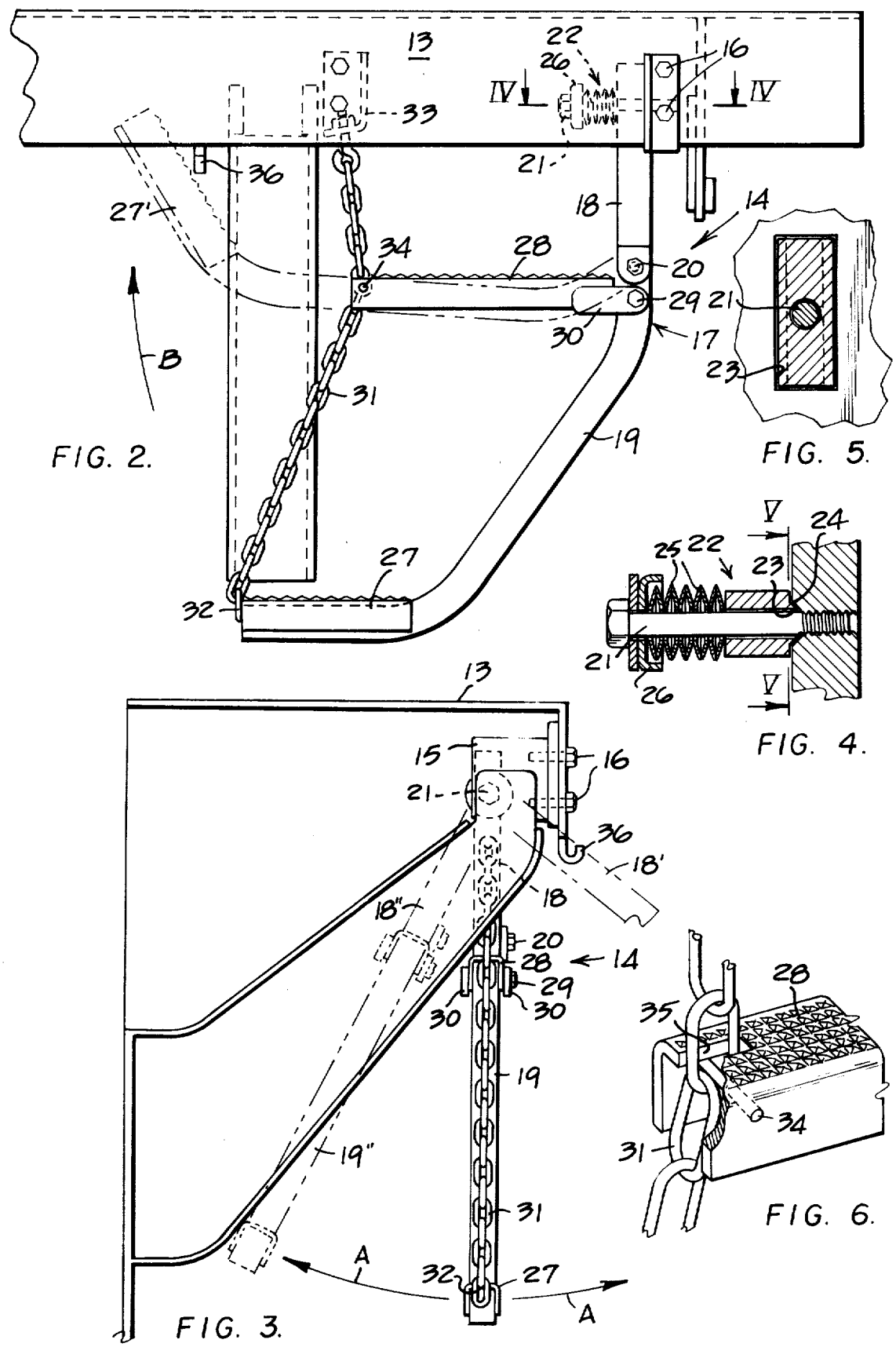

STEP ASSEMBLY FOR CONSTRUCTION VEHICLES

BACKGROUND OF THE INVENTION

This invention relates to a step assembly for construction vehicles, such as a motor grader. The step assembly employed on a motor grader is strategically located thereon to provide the operator with access to the operator's station. Conventional step assemblies are normally secured to the outer edge of the operator's platform and suspended vertically therebelow in a rigid manner. Such a step assembly must exhibit sufficient structural rigidity to withstand forces imposed thereon during operation or shipment of the motor grader and must further be designed to provide the operator with easy access to the operator's platform. One approach to the potential damage problem is disclosed in U.S. Pat. No. 3,854,752, assigned to the assignee of this application, wherein a step is pivotally mounted on a frame of a construction vehicle to permit it to pivot upon impact with an obstruction or the like.

SUMMARY OF THIS INVENTION

An object of this invention is to provide an improved step assembly for construction vehicles which exhibits a high degree of structural integrity and is capable of withstanding extraneous forces imposed thereon. The step assembly comprises a mounting bracket adapted to be secured on a frame of the vehicle and a support bracket, having a first step mounted on a lower end thereof, having its upper end pivotally mounted on the mounting bracket. Releasable detent means are preferably provided between the mounting and support brackets for normally holding the support bracket in a vertically disposed position for ascent of the operator thereon and for permitting pivoting thereof when an extraneous force is imposed on the support bracket.

Another feature of this invention comprises the formation of the support bracket by a pair of first and second members and with or without the releasable detent means. An upper end of the first member is pivoted mounted on the mounting bracket to adapt it for swinging movement in a first plane whereas an upper end of the second member is pivotally mounted on a lower end of the first member to adapt it for swinging movement in a second plane, perpendicular to the first plane. Still another feature of this invention is the provision of a pair of steps, the first step being secured to a lower end of the second member and a second step being secured to the second member and disposed vertically above the first step.

BRIEF DESCRIPTION OF THE DRAWINGS

Other objects of this invention will become apparent from the following description and accompanying drawings wherein:

FIG. 2 is an enlarged front elevational view of the step assembly;

FIG. 3 is an end elevational view of the step assembly;

FIG. 4 is an enlarged sectional view of a releasable detent means employed in the step assembly, taken in the direction of arrows IV—IV in FIG. 2;

FIG. 5 is a view taken in the direction of arrows V—V FI. 4 to illustrate further details of the releasable detent means; and FIG. 6 is an enlarged isometric view illustrating the connection of a chain to a step employed in the step assembly.

DETAILED DESCRIPTION

Figure 1:
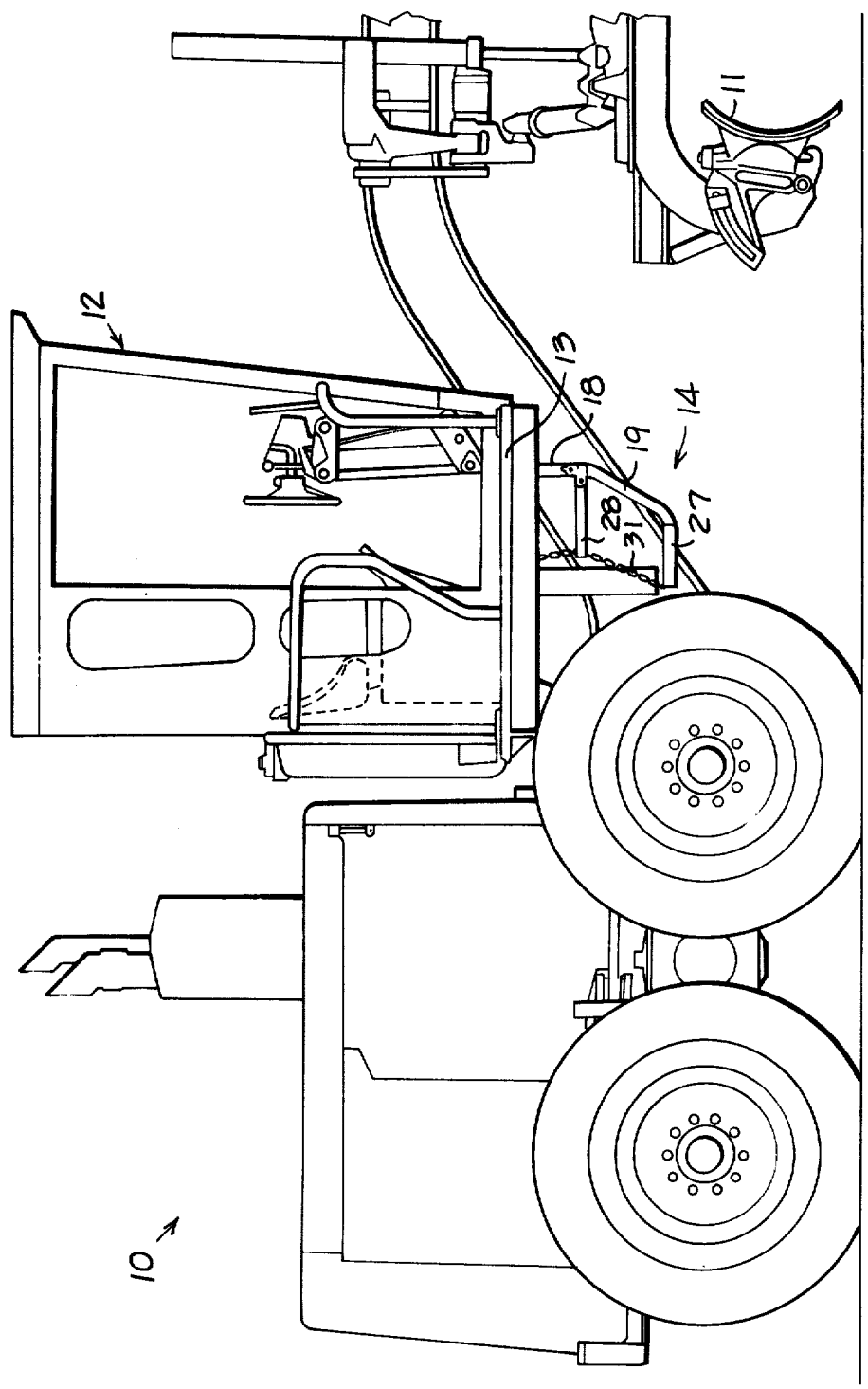
FIG. 1 is a partial side elevational view of a motor grader having the step assembly of this invention mounted thereon.

FIG. 1 illustrates a construction vehicle, such as a motor grader 10, having a blade 11 suitably mounted thereon for earthworking purposes. An operator's station 12 is mounted on a horizontally disposed operator's platform 13 of the vehicle. Access to the platform and operator's station is achieved by means of a step assembly 14 embodying this invention.

Referring to FIGS. 2 and 3, the step assembly comprises a mounting bracket 15 suitably secured under platform 13 by a pair of bolts 16. A support bracket, generally shown at 17, includes a first vertically disposed member 18 having its lower end pivotally connected to an upper end of a second member 19 thereof by a pivot means or bolt 20. An upper end of member 18 is pivotally mounted on support bracket by a pivot means or bolt 21, as more clearly shown in FIG. 4.

A releasable detent means 22 normally holds the support bracket in its vertically disposed position to permit ascent thereon by the operator. The detent means will release the support bracket automatically for swinging movement along are arc A (FIG. 3) in a first plane and relative to the mounting bracket upon imposition of an extraneous force of predetermined magnitude thereon. As shown in FIG. 2, pivot means 20 permits member 19 to swing along an arc B in a second plane disposed transversely and preferably perpendicular relative to the first plane containing arc A.

Referring to FIGS. 4 and 5, the detent means comprises a vertically disposed and generally V-shaped groove 23 formed on the mounting bracket and a like-shaped detent 24 formed on the support bracket. The lengths and depths of the groove and detent are so constructed and arranged so as to ensure positive locking therebetween upon ascent of the operator on the step assembly and to permit release thereof when struck by blade 11, for example.

Referring to FIG. 4, the releasable detent means further comprises spring means for normally biasing detent 24 into groove 23. In the embodiment illustrated, such spring means constitutes a plurality of stacked Belleville washers 25 mounted on the shank of bolt 21 in abutting relationship between member 18 and a cup-shaped retainer 26. It can be further seen that bolt 21 provides adjustment means for selectively varying the preload force imposed by the Belleville spring washers on member 18 to thus vary the force required to release detent 24 from groove 23 to permit member 18 to swing between its phantom-lined positions 18' and 18" in FIG. 3. In addition, such adjustment means may be periodically varied to compensate for any wear occasioned in the detent means.

Referring again to FIGS. 2 and 3, the step assembly further comprises a first step 27 secured on a lower end of member 19 and disposed horizontally for engagement with the foot of an operator for ascent purposes. A second step 28 is disposed vertically above step 27 and in parallel relationship therewith and has its inner end pivotally mounted on member 19 by a bolt 29. A psir of plates 30 are welded to outboard sides of step 28 to form an integral part thereof to thus provide a bifurcated end of the step which is pivotally mounted on member 19.

A chain 31 has is lower link 32 secured to an outer end of step 27 and its upper end mounted on a bracket 33 attached to platform 13 (FIG. 2). As shown in FIG. 6, the chain is further attached to an outer end of step 28 by a pin 34 and a slot 35 is formed in the outer end of step 28 to accommodate the chain therein. The chain thus functions as a flexible support means for the steps.

When the operator desires to mount platform 13 and enter cab 12, he merely steps upon steps 27 and 28, which have narrow tread or non-skid areas formed thereon, to mount the same. Detent means 22 will apply a sufficient holding force to member 18 of support bracket 17 to prevent pivoting thereof about bolt 21 upon such mounting. When the vehicle is placed in operation, the substantial universal mounting of step assembly 14 on platform 13 will prevent damage thereto or any component of the machine that may come in contact therewith.

In particular, FIG. 3 illustrates possible swinging movements of member 18 to positions 18' and 18" in plane A should forces be imposed on the step assembly in the direction of vehicle movement. Furthermore, as shown in FIG. 2 any force imposed on member 19 of support bracket 17 will permit the member and attached step 27 to pivot upwardly towards its 27' position, upon pivoting about pivot pin 20 in plane B, perpendicularly relative to plane A. Upon removal of such force, the step assembly will return automatically to its normal full-line position in FIGS. 1–3, under the influence of gravity. If so desired one or more standard return springs (not shown) could be operatively connected between member 18 and bracket 15 or platform 13 to aid in or solely provide for the automatic return of the step assembly. Upon shipping of the vehicle to a remote job site, for example, chain 31 can be suitably engaged over a hook 36 to store step 27 in its phantom-lined position 27' illustrated in FIG. 2.

I claim:

1. A step assembly for construction vehicles and the like comprising
    a mounting bracket,
    a support bracket comprising first and second members,
    first pivot means pivotally mounting an upper end of the first member of said support bracket on said mounting bracket for permitting swinging movement of said first member relative to said mounting bracket,
    second pivot means pivotally mounting an upper end of said second member on a lower end of said first member for permitting said second member to swing in a plane disposed transversely relative to a plane of swinging movement of said first member relative to said support bracket,
    a first step mounted on a lower end of said second member,
    a second step disposed vertically above said first step and attached to said second member, and
    releasable detent means for normally holding said support bracket in a vertically disposed position and releasable upon application of a predetermined force imposed on said support bracket for swinging said support bracket relative to said mounting bracket.

2. The step assembly of claim 1 further comprising a construction vehicle having a platform and an operator's cab mounted on said platform, said mounting bracket attached to said platform.

3. The step assembly of claim 1 wherein said step assembly is mounted on a platform of a construction vehicle and further comprising flexible support means having a lower end attached to an outer end of said first step and an upper end thereof attached to said platform and wherein said flexible support means is further attached to an outer end of said second step.

4. The step assembly of claim 3 wherein said flexible support means constitutes a chain.

5. The step assembly of claim 1 wherein said releasable detent means comprises means forming a vertically disposed groove in said mounting bracket and a vertically disposed detent formed on said support bracket and normally disposed in locked engagement within said groove.

6. The step assembly of claim 5 wherein said groove and said detent are each generally V-shaped when viewed in cross section.

7. The step assembly of claim 6 wherein said releasable detent means further comprises spring means for normally biasing said detent into locked engagement within said groove.

8. The step assembly of claim 7 wherein said first pivot means constitutes a bolt having said support bracket pivotally mounted thereon and wherein said bolt is threadably mounted in said mounting bracket.

9. The step assembly of claim 8 wherein said spring means comprises a plurality of Belleville spring washers mounted on the shank of said bolt and disposed axially between a head thereof and said support bracket.

10. A step assembly in combination with a construction vehicle having a platform and an operator's cab on said platform comprising
    a mounting bracket attached to said platform,
    a support bracket including a first member having an upper end thereof pivotally mounted on said mounting bracket by first pivot means for swinging movement in a first plane and a second member having an upper end thereof pivotally mounted on a lower end of said first member by second pivot means for swinging movement in a second plane disposed transversely relative to said first plane,
    a first step secured on a lower end of said second member, and
    a second step disposed vertically above said first step and attached to said second member.

11. The step assembly of claim 10 further comprising releasable detent means for normally holding said first member relative to said mounting bracket and releasable upon application of a force imposed on said support bracket.

12. The step assembly of claim 10 further comprising flexible support means having a lower end attached to an outer end of said first step and an upper end thereof attached to said platform and wherein said flexible support means is further attached to an outer end of said second step.

13. The step assembly of claim 12 wherein said flexible support means constitutes a chain.

14. The step assembly of claim 10 wherein said first pivot means constitutes a bolt having said first member pivotally mounted thereon and wherein said bolt is threadably mounted in said mounting bracket.

15. The step assembly of claim 14 wherein said second pivot means constitutes a bolt.

16. A step assembly for construction vehicles and the like comprising
   a mounting bracket,
   a support bracket including a first member having an upper end thereof pivotally mounted directly on said mounting bracket by first pivot means for swinging movement in a first plane and a second member having an upper end thereof solely pivotally mounted on a lower end of said first member by second pivot means for swinging movement in a second plane disposed transversely relative to said first plane, said first pivot means constituting a bolt having said first member pivotally mounted thereon and wherein said bolt is threadably mounted in said mounting bracket, and
   a step secured on a lower end of said second member.

* * * * *